Jan. 15, 1952  W. WAHLI  2,582,727
PROCESS AND DEVICE FOR THE MEASURING
OF ROTATIONAL VELOCITIES
Filed Dec. 27, 1946  2 SHEETS—SHEET 1

WERNER WAHLI
INVENTOR
BY
his ATTORNEY

INVENTOR.
Werner Wahli
BY Walter S. Heston
ATTORNEY.

Patented Jan. 15, 1952

2,582,727

UNITED STATES PATENT OFFICE 2,582,727

PROCESS AND DEVICE FOR THE MEASURING OF ROTATIONAL VELOCITIES

Werner Wahli, Berne-Bumpliz, Switzerland

Application December 27, 1946, Serial No. 718,836
In Switzerland January 19, 1946

18 Claims. (Cl. 264—1)

The present invention relates to the measurement of rotational velocities.

The object of the present invention is a process for the measurement of rotational velocities by means of a fluid pump driven at the speed requiring to be measured, in which process quantities delivered by the pump in cyclically successive periods of equal duration are each segregated for the purpose of being measured separately.

The momentary quantity delivered by the fluid pump stands in proportional relationship to the momentary driving speed of the pump, which driving speed it is desired to measure. Thus each and every one of these segregated quantities delivered is in the process forming the object of the present invention a quantity proportional to the mean driving speed of the pump over the relevant period of time, which driving speed it is required to ascertain.

As a device for carrying out the said process which forms the object of the invention there may be provided as minima one measuring chamber for the fluid delivered by the pump, which latter is driven at the rotational speed requiring to be measured, and a control organ located on the delivery line between the pump and the measuring chamber and suitably arranged for fulfilling at least two functions in relation to each measuring chamber, by means of which control organ, in the performance of one of its functions, the fluid pumped is supplied to the measuring chamber, whilst in the performance of the other function the fluid pumped is evacuated from said measuring chamber.

The control organ can moreover be so designed in relation to each measuring chamber that it performs a further function successive, in time, to the first-named function, in accordance with which additional function the quantity of fluid contained in the measuring chamber is confined therein. The device may, in order to provide a velocity meter of practical efficiency, be provided by way of example, with three measuring chambers.

Figure 1:
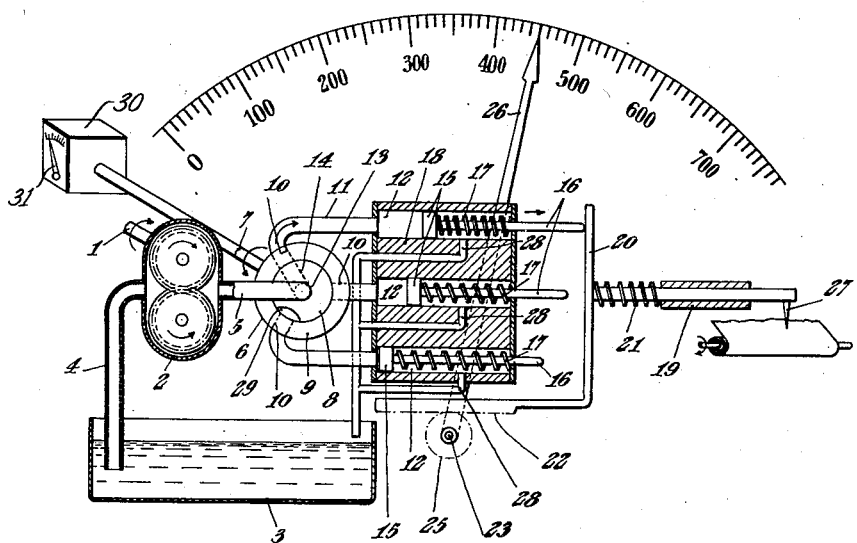
Figure 1A:
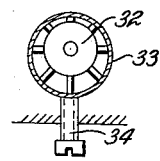
Figure 2:
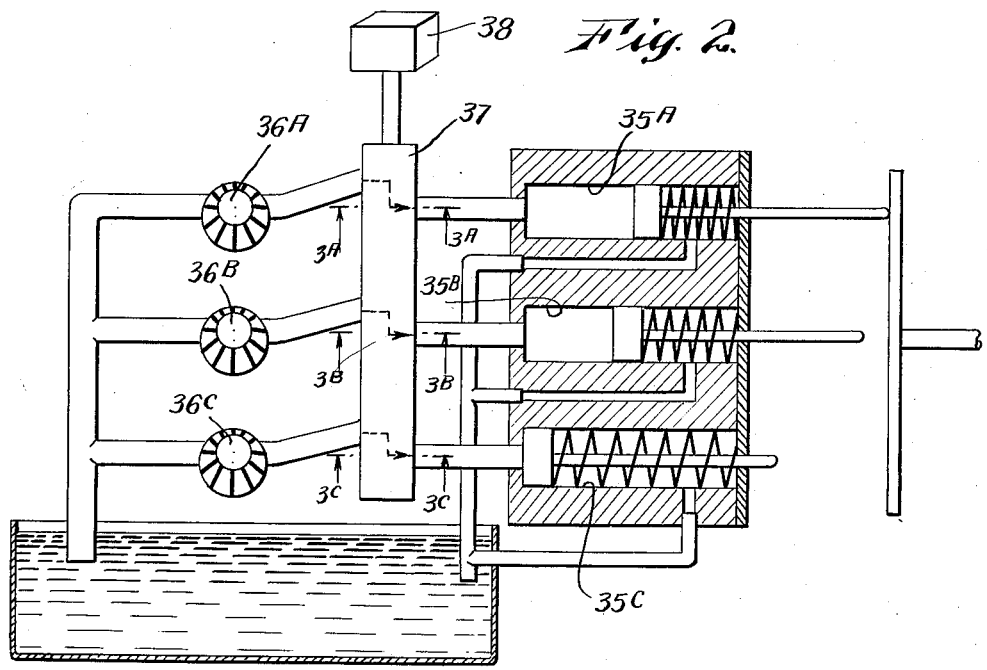
Figure 3:
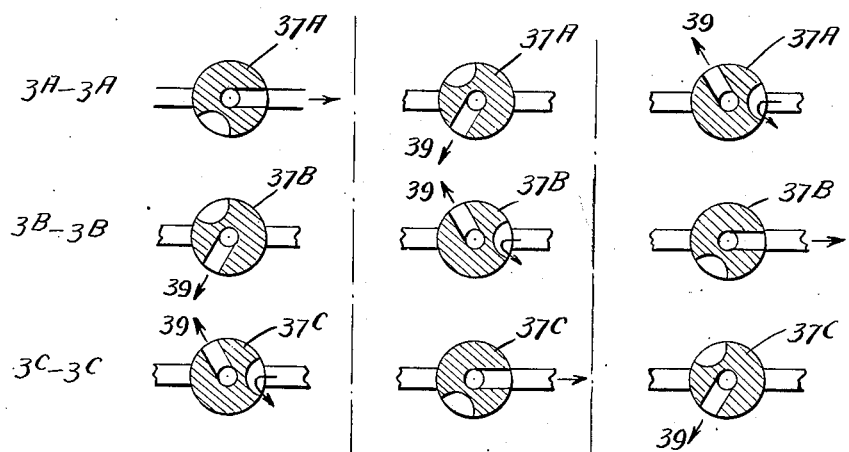

Further objects and details of the invention will be apparent from the description given hereinafter and the accompanying drawings illustrating an embodiment thereof by way of example. In the drawing, Fig. 1 is a diagrammatical illustration of a device according to the invention, Fig. 1a is a diagrammatical illustration of another type of pump useful with the device, Fig. 2 is a diagrammatical illustration of part of the device of Fig. 1 with pumps according to Fig. 1a; and Fig. 3 is a diagram showing the control element in three different positions.

The shaft 1 drives, in the rotational direction indicated by the arrow, a fluid pump 2, which may by way of example take the form of a gear pump, which pump conveys from the container 3 through the suction pipe 4 and through the pressure pipe 5 into the distributing device 6 a quantity of fluid proportionate to the rotational speed of the pump. This controlling or distributing device 6 has a rotary valve body 8 driven by means of a shaft 7 in the direction indicated by the arrow and located in an annular housing 9 fitted with three outlet ports 10 arranged at an angle of 120° each to the other, each of which outlet ports communicates through a connecting pipe 11 with its particular measuring chamber 12. The fluid delivered passes through the pressure pipe 5, in Fig. 1 from the front end, into a central bore 13 of the valve body 8 and thence through a radial bore 14 in the same, through the outlet port 10 of the valve housing 9 and through the connecting pipe 11 into the relevant measuring chamber 12. All three measuring chambers 12 preferably take the form of cylindrical cavities of like dimensions, in each of which a measuring plunger 15 with a plunger-rod 16 projecting from the cylinder is arranged in such manner that it can be displaced and is subject to the action of a spiral spring 17, which latter tends to force the plunger into the zero position, the latter being, in Fig. 1, the cylinder end adjacent to the control valve. The cylinders 12 are arranged each parallel to the others in a common housing 18. That end of each plunger-rod 16 opposite to that carrying the measuring plunger acts in an axial direction on a plate 20 common to all the plunger-rods which is so disposed in the guides 19 as to be capable of movement in the said axial direction, and which is kept in contact, by means of a spiral spring 21, with that plunger rod 16 which at any given moment projects farthest from the housing 18. The plate 20 bears, arranged in the direction of its motion, a rack 22 which engages with a pinion 25 mounted on the axle 23 of the pointer of an indicating device 24 and transmits the motion of the plate 20 to the pointer 26 of the indicating device 24. The plate may alternatively be fitted with a stylus 27 which traces the motions on a recording strip in the known manner.

In order to avoid damage to the velocity meter should its range of measurement be exceeded, an overflow port 28 is arranged in each cylinder 12 at that point in the stroke of the plunger which corresponds to the limit of measurement, this overflow port leading into the container 3.

The rotary valve body 8 is provided with a recess 29 arranged at an angle of 120° to the radial bore 14, through which recess the fluid expelled by the plunger on its return, propelled by the spring, to its zero position, passes out into the container 3.

The cycle of operations of each single measuring chamber 12 is as follows: in an initial operative position, maintained for a relatively short period of, for example, half a second, of the rotary valve body 8 the radial bore 14 of the latter coincides with the part 10 and connecting pipe 11 provided for the particular measuring chamber 12.

During this predetermined period of time the pump 2 delivers to the measuring chamber 12 a quantity of fluid proportionate to the average speed of the driving shaft 1 for the said interval of time, this resulting in the measuring plunger 15 being forced from its zero position to a measuring point corresponding to the quantity of fluid which has entered the cylinder. The measuring point reached by the plunger 15 consequently yields, in respect of the said mean velocity, a quantity measurement which, through the intermediary of the transmitting and indicating devices 20 and 24, can be read on a scale. On termination of the period of time during which the rotary valve body remains in its first operative position, the valve is rotated, preferably by a sudden jerk or step, at high speed, in the rotational direction indicated by the arrow, to the extent of 120°, until it assumes a second operative position in which it closes the port 10 and, in consequence, the connecting pipe 11 and the measuring chamber 12. Through this the plunger 15 is maintained stationary in its measuring position for the period during which the rotary valve body remains in this second operational position. At the termination of this second period a further rapid rotation of the rotary valve body by 120° in the rotational direction indicated, to a third operational position, takes place in the form of a sudden jerk, through which motion the recess 29 on the valve body 8 comes into communication with the port 10, so that as a result of the return stroke of the plunger 15, operated by the spring 17, to take up its zero position during a third period, the quantity of fluid corresponding to the plunger stroke is expelled into the container 3. On termination of the third period the cycle of three operations can recommence.

In the typical embodiment of the device three measuring chambers 12 are provided, to all of which is allocated one and the same rotary valve 8 as a distributing organ. The operational steps described in relation to one of the measuring chambers also take place in relation to the two other measuring chambers, but in succession, so that when the velocity meter is in operation, if the periods occupied by the individual steps or stages are made equal as to duration, then at any given moment one measuring chamber is at the stage of fluid-intake or filling, one at the stage of confinement and one at the evacuating stage. There thus takes place a cycle of processes which is dependent on the operation of the rotary valve. The operation of the valve is provided for by a clockwork mechanism through the medium of an escapement, which clockwork mechanism can be of similar design to those incorporated in velocity meters working on mechanical principles. Such clockwork mechanism is indicated at 30. It is connected by shaft 7 to the control element 8. The rhythm according to which this valve is operated when the latter moves in steps or jerks, that is to say the duration of the period allowed for each of the three operational processes, even if the rotary valve is arranged to rotate uniformly, can be adjusted by setting the pointer 31, so that the measuring range of the device can be varied.

In order to vary the measuring range of the velocity meter it is also possible for the delivery capacity of the pump to be made variable within certain limits, for instance by using a rotary pump of variable eccentricity. A pump of such type is diagrammatically illustrated in Fig. 1a wherein the pump housing 33 can be adjusted as to its eccentricity with respect to the pump rotor 32 by means of the screw 34. Fig. 2 shows three such pumps 36A, 36B and 36C connected by conduits 3A, 3B and 3C to measuring chambers 35A, 35B and 35C, respectively. A control device 37 driven by the clockwork 38 is common to the three pumps. Fig. 3 shows three different positions of the control element in relation to the conduits 3A, 3B and 3C. In Fig. 3a, the position of the control element 37A in relation to conduit 3A is such that the radial duct 39 communicates with conduits 3A so that fluid can pass to the connected chamber 35A. The outlet recess 40 is disconnected from conduit 3A. At the same time the position of the control element is that marked 37B in relation to the conduit 3B where both the duct 39 and the recess 40 are disconnected from the conduit. Also at the same time the control element is in the position 37C in relation to conduit 3C so that the fluid can be discharged from chamber 35C through the recess 40. Fig. 3b shows the control element turned 120°. In this position, duct 39 and recess 40 are disconnected; chamber 35B will be discharged as the recess 40 registers with conduit 3B whereas chamber 35C will be charged. In Fig. 3c, i. e. at 240° from the position of Fig. 3a, chamber 35A will be discharged, chamber 35B will be charged, and chamber 35C is disconnected. In all other respects, the modified device of Figs. 2 and 3 is similar to the device of Fig. 1.

Losses through leakage in the delivery, distributory and measuring organs can be allowed for by, for instance, calibrating accordingly the scale on the indicating device, even if in practice such losses are negligible.

Of primary importance in the measurement of speeds, in particular the constant measurement therefore, as when, for instance, they are being recorded, are the quantities of fluid delivered by the fluid pump in successive periods of equal duration to the measuring chambers involved at any given moment. The periods of time utilised for those operational processes which consist in the closure of and the evacuation of the measuring chambers do not of necessity have to coincide with those allotted to the delivery of the fluid, or filling process, since for this purpose constructional modifications to the device described as a typical embodiment may readily be imagined.

It is also possible to have more than one fluid pump, each being provided with at least one measuring chamber, the individual filling processes of all the measuring chambers succeeding each other periodically, the whole being controlled by a control or distributing organ common to all the measuring chambers.

While the invention has been described with respect to a somewhat schematic embodiment, it will be understood by those skilled in the art, after understanding the invention, that various forms of constructions may be made without departing from the spirit and scope of the invention, and it is intended, therefore, in the appended claims to cover all such forms of construction.

What I claim is:

1. A process for measuring rotational velocities comprising the steps of driving a fluid pump at the speed to be measured, segregating quantities of fluid delivered by the pump in cyclically successive periods of predetermined duration, and measuring the quantities separately.

2. A process for measuring rotational velocities comprising the steps of driving a fluid pump at the speed to be measured, segregating quantities of fluid delivered by the pump in cyclically successive periods of predetermined duration, adjusted according to the range of speeds to be measured, and measuring the quantities separately.

3. A process for measuring rotational velocities comprising the steps of driving a fluid pump at the speed to be measured, segregating quantities of fluid delivered by the pump in cyclically successive periods of predetermined duration, adjusting the delivering capacity of the pump and measuring the quantities separately.

4. A device for the measurement of rotational velocities, comprising a fluid pump adapted to be driven at the rotational speed to be measured, a measuring chamber for fluid delivered by said pump and a control element, disposed between said pump and said measuring chamber, and adapted for the performance of two functions in the course of the performance of one of these functions pumped fluid is supplied to the measuring chamber and in the course of the performance of the other function pumped fluid is evacuated therefrom.

5. A device as claimed in claim 4, said control element being adapted for performing a third function which follows the first-named function, in the course of which third function the quantity of fluid contained in the measuring chamber at the end of the first function is confined therein.

6. A device for the measurement of rotational velocities comprising a fluid pump adapted to be driven at the rotational speed to be measured, a plurality of measuring chambers, a delivery line connecting said pump to said chambers, a control element disposed in said line between said pump and each of said chambers and adapted for the performance, in respect of each of said measuring chambers, of two functions, in the course of the performance of one of these functions pumped fluid is supplied to said measuring chamber and in the course of the performance of the other function pumped fluid is evacuated therefrom.

7. A device as claimed in claim 6, the control element being adapted to cyclically connect each of said measuring chambers in turn with the delivery side of the pump, to shut said chamber off therefrom, and to open said chamber for evacuation purposes.

8. A device for the measurement of rotational velocities, comprising a fluid pump adapted to be driven at the rotational speed to be measured, a measuring chamber for fluid delivered by said pump, and a rotary valve, disposed between said pump and said measuring chamber, and adapted for the performance of two functions, in the course of the performance of one of these functions pumped fluid is supplied to the measuring chamber and in the course of the performance of the other function pumped fluid is evacuated therefrom.

9. A device for the measurement of rotational velocities comprising a fluid pump adapted to be driven at the rotational speed to be measured, a plurality of measuring chambers, a delivery line connecting said pump to said chambers, a rotary valve disposed in said line between said pump and each of said chambers and adapted for the performance, in respect of each of said measuring chambers, of two functions, in the course of the performance of one of these functions pumped fluid is supplied to said measuring chamber and in the course of the performance of the other function pumped fluid is evacuated therefrom.

10. A device for the measurement of rotational velocities, comprising a fluid pump adapted to be driven at the rotational speed to be measured, a measuring cylinder, a plunger movably disposed in said cylinder, and a control element, disposed between said pump and said measuring cylinder, and adapted for the performance of two functions, in the course of the performance of one of these functions pumped fluid is supplied to the measuring cylinder and in the course of the performance of the other function pumped fluid is evacuated therefrom.

11. A device for the measurement of rotational velocities, comprising a fluid pump adapted to be driven at the rotational speed to be measured, a measuring cylinder, a plunger movably disposed in said cylinder, and a rotary valve disposed between said pump and said measuring cylinder, and adapted for the performance of two functions, in the course of performance of one of these functions pumped fluid is supplied to the measuring cylinder, and in the course of the performance of the other function pumped fluid is evacuated therefrom.

12. A device for the measurement of rotational velocities, comprising a fluid pump adapted to be driven at the rotational speed to be measured, a plurality of measuring cylinders, plungers movably disposed, respectively, in said cylinders, a delivery line connecting said pump to said cylinders, a control element disposed in said line between said pump and each of said cylinders, and adapted for the performance, in respect of each of said measuring cylinders, of two functions, in the course of the performance of one of these functions pumped fluid is supplied to said cylinders and in the course of the performance of the other function pumped fluid is evacuated therefrom.

13. A device for the measurement of rotational velocities, comprising a fluid pump adapted to be driven at the rotational speed to be measuerd, a plurality of measuring cylinders, plungers movably disposed, respectively, in said cylinders, a delivery line connecting said pump to said cylinders, a rotary valve disposed in said line between said pump and each of said cylinders, and adapted for the performance, in respect of each of said measuring cylinders, of two functions, in the course of the performance of one of these functions pumped fluid is supplied to said cylinders, and in the course of the performance of the other function pumped fluid is evacuated therefrom.

14. A device for the measurement of rotational velocities, comprising a fluid pump adapted to be driven at the rotational speed to be measured, a measuring cylinder, a plunger movably disposed in said cylinder, an overflow opening in said cylinder adapted to be uncovered by said plunger in one end position thereof, and a control element, disposed between said pump and said measuring cylinder, and adapted for the performance of two functions, in the course of the performance of one of these functions pumped fluid is supplied to the measuring cylinder and in the course of the performance of the other function pumped fluid is evacuated therefrom.

15. A device for the measurement of rotational velocities comprising a fluid pump adapted to be driven at the rotational speed to be measured, means for adjusting the delivery capacity of said pump, a plurality of measuring chambers, a delivery line connecting said pump to said chambers, a control element disposed in said line between said pump and each of said chambers and adapted for the performance, in respect of each of said measuring chambers, of two functions, in the course of the performance of one of these functions pumped fluid is supplied to said measuring chamber and in the course of the performance of the other function pumped fluid is evacuated therefrom.

16. A device for the measurement of rotational velocities comprising a plurality of fluid pumps each adapted to be driven at the rotational speed to be measured, a plurality of measuring chambers, at least one for each of said pumps, delivery lines connecting, respectively, said pumps to said chambers, and a common control element adapted for the performance, in respect of each of said measuring chambers, of two functions, in the course of the performance of one of these functions pumped fluid is supplied to said measuring chamber and in the course of the performance of the other function pumped fluid is evacuated therefrom.

17. A device for the measurement of rotational velocities comprising a rotary fluid pump, a measuring means adapted to receive fluid from said pump, a conduit between said pump and said means, a control organ in said conduit and operative in cycles of predetermined length to admit fluid from said pump to said means during one part of each cycle and to drain the admitted fluid during another part of each cycle, said means including a member responsive to and indicative of the quantity of fluid delivered by said pump to said means per each of said cycles as a measure of the rotary speed at which said pump is driven.

18. A device for the measurement of rotational velocities comprising a fluid pump adapted to be driven at the rotational speed to be measured, a chamber, a conduit between said pump and said chamber, a drain for said chamber, a cyclically operative control device in said conduit, said device including a first means for opening the passage of fluid through said conduit during a first part of a cycle of said device and a second means to close said passage and to connect said chamber to said drain during another part of said cycle, and third means in connection with said chamber to indicate the quantity of fluid pumped into said chamber during said first part of said cycle.

WERNER WAHLI.

REFERENCES CITED

The following references are of record in the file of this patent:

UNITED STATES PATENTS

| Number | Name | Date |
|--------|------|------|
| 13,792 | Krauser et al. | Nov. 13, 1855 |
| 669,347 | Quinn | Mar. 5, 1901 |
| 1,347,276 | Johnson | July 20, 1920 |
| 1,455,832 | Church | May 22, 1923 |
| 1,822,667 | Proell | Sept. 8, 1931 |
| 2,227,841 | Nallinger | Jan. 7, 1941 |